D. HULETT & S. CHANDLER.
Gas-Purifying Apparatus.
No. 156,351. Patented Oct. 27, 1874.
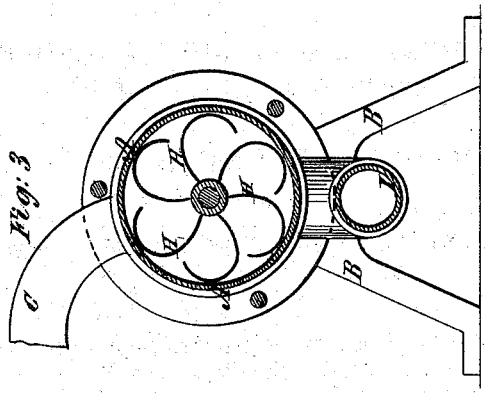
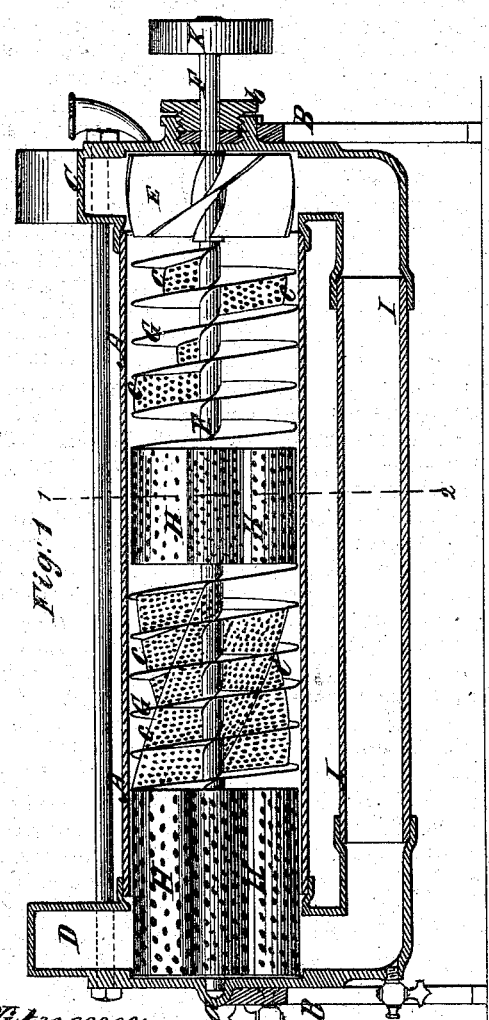
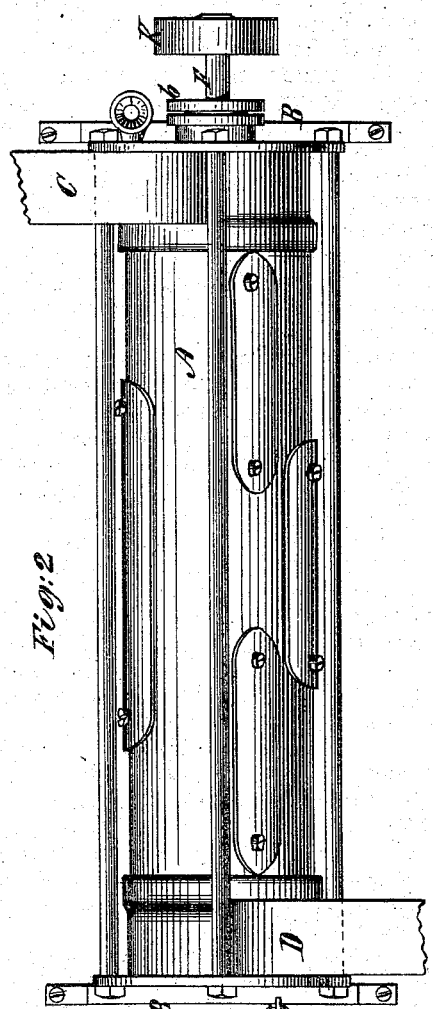

UNITED STATES PATENT OFFICE.

DAVID HULETT, OF 55 AND 56 HIGH HOLBORN, AND SAMUEL CHANDLER, OF YORK STREET, LONDON ROAD, SOUTHWARK, ENGLAND.

IMPROVEMENT IN GAS-PURIFYING APPARATUS.

Specification forming part of Letters Patent No. 156,351, dated October 27, 1874; application filed August 22, 1874.

*To all whom it may concern:*

Be it known that we, DAVID HULETT, of 55 and 56 High Holborn, in the county of Middlesex, England, and SAMUEL CHANDLER, of York Street, London Road, Southwark, in the county of Surry, England, gas-engineers, subjects of the Queen of Great Britain, have invented or discovered new and useful Improvements in Apparatus used in the Purification of Gas; and we, the said DAVID HULETT and SAMUEL CHANDLER, do hereby declare the nature of the said invention, and in what manner the same is to be performed, to be particularly described and ascertained in and by the following statement thereof; that is to say—

This invention consists of the combination of an archimedean screw, with a vessel for containing water or other suitable gas-purifying agent or agents, said screw operating in connection with one or more beaters or agitators, and a fan or exhauster, as hereinafter set forth. The invention also consists in combining a pipe or channel with the vessel containing the screw, in such a manner as to maintain a continuous circulation of the gas-purifying agent or agents with the vessel during the rotation of the screw; and in order that the said invention may be clearly understood, we will now proceed more particularly to describe the same, and for that purpose refer to the several figures on the accompanying drawing, the same letters of reference indicating corresponding parts in all the figures.

Figure 1 is a longitudinal section of our improved apparatus; Fig. 2, a corresponding plan of the same; and Fig. 3 a transverse section on the line 1 2, in Fig. 1.

A is a vessel, containing water or other suitable purifying material. This vessel, which may be of a cylindrical or other suitable shape, is supported on the standards B B, and provided with inlet and outlet pipes C and D, respectively, for the entrance and exit of the gas or other vapor to be treated. The gas or other vapor enters the vessel A through the inlet-pipe C, its entrance being facilitated by a fan or exhauster, E, fitted on the shaft or spindle F, which extends the entire length of the vessel A, and may have its bearings in the end covers thereof, as shown at *a b*, or be otherwise supported. G is an archimedean screw, carried upon the shaft F, and may, if desired, extend the entire length of the vessel A, but we prefer to divide it into lengths, and interpose between the said lengths beaters or agitators H H, as shown in the drawing. The screw G may be either plain throughout, or have plates C' C' arranged at suitable distances apart between the threads, as shown. The arms of the beaters or agitators H and the plates *c* we prefer to make of perforated metal, in order to facilitate their passage through the purifying material contained in the vessel A, and also to insure a thorough mixing of the gas or other vapor with the said purifying material, and thereby more effectually cleanse the said gas or other vapor from the impurities contained therein. The gas or other vapor upon entering the vessel A is, by the rotation of the screw G, caused to enter and pass through the purifying material, the intermingling with which is further facilitated by the agitators or beaters H H. The gas, after having passed through the purifying material, escapes from the vessel A through the outlet-pipe D, and may be conducted to a dry lime-purifier, or any other suitable apparatus, to be further treated, if found desirable. The purifying material is caused to travel from the inlet end to the outlet end of the vessel A by the rotation of the screw G; and as we have found in practice that there is a liability when driving the screw at a high speed to partially close the outlet-pipe D, and thereby prevent the free escape of the gas, to obviate this defect, we fit to the bottom or other suitable part of the vessel A a tube, I, which communicates with the said vessel at or near the ends thereof, as shown in the drawing, and through this pipe the purifying material passes from the outlet end to the inlet end of the vessel, thereby maintaining a constant circulation of the purifying material; or, in lieu of the pipe I, a gutter or channel may be formed in the bottom of the vessel A, or the vessel may be made of an elliptic or other suitable form, so as to leave a space below the screw to contain a body of the purifying material. The vessel may be charged with the purifying material through either the inlet or outlet pipe, or, if desired, a separate charging aperture may be provided. A suitable discharge cock or valve may be fitted to any convenient part of the apparatus for discharging the purifying material from the vessel A, when desired. The shaft F may be actuated from any suitable prime mover by means of a strap passing over the driving-pulley K, or by any other suitable means. In practice we have found water alone to effect the desired object of sufficiently purifying gas when used in the apparatus described in our specification, but we believe that a solution of oxide of iron may be beneficially employed as a purifying material instead of water.

Having now fully described the nature of the said invention, and the manner in which the same is or may be used or carried into effect, we wish it to be understood that what we claim is—

1. The archimedean screw G, mounted on a shaft, F, within a vessel for containing water or other gas-purifying agent, in combination with a beater and a fan or exhauster, substantially as described, for the purpose specified.

2. In combination with a vessel for containing gas-purifying agents, a pipe or channel communicating at each end with the interior of the purifying vessel, substantially as described, whereby is maintained a continuous circulation of the purifying agent during the operation of the screw, as set forth.

D. HULETT.
S. CHANDLER.

Witnesses:
CHARLES BARLOW,
23 *Southampton Buildings*,
*London, Patent Agent*,
SHIRLEY BOWDEN,
33 *Southampton Buildings*.